Aug. 6, 1957  H. B. GROW  2,801,736
TEA BAG OR SIMILAR CONTAINER
Filed July 19, 1954
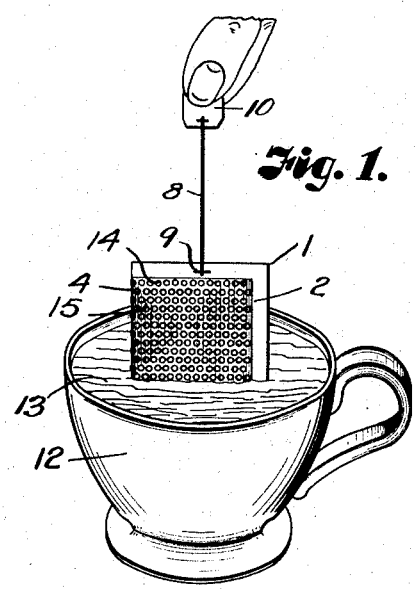
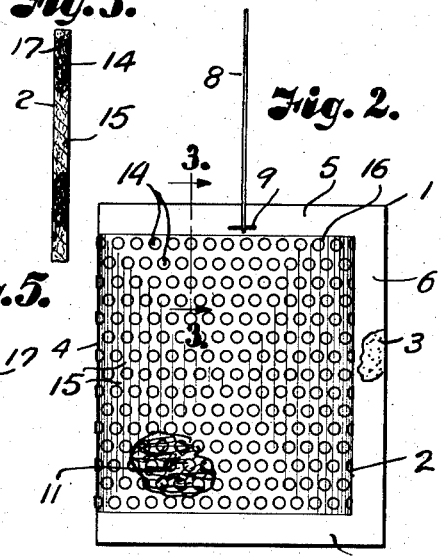
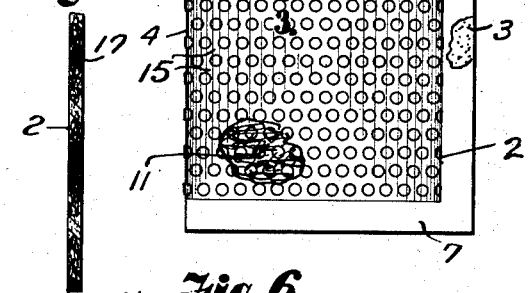
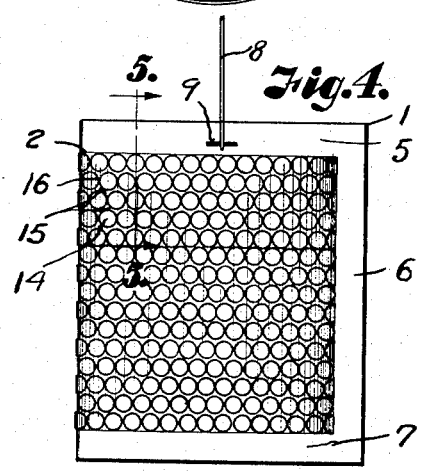
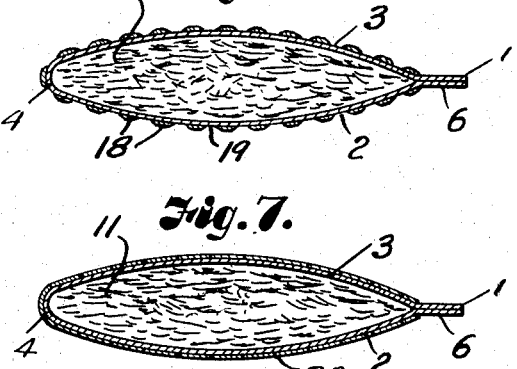
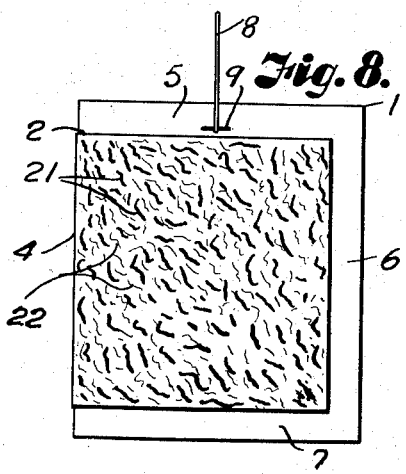
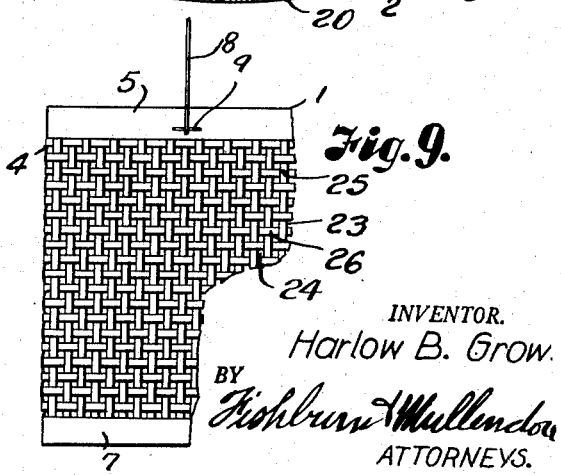
INVENTOR.
Harlow B. Grow.
BY
ATTORNEYS.

United States Patent Office 2,801,736
Patented Aug. 6, 1957

2,801,736

TEA BAG OR SIMILAR CONTAINER

Harlow B. Grow, Pacific Palisades, Calif.

Application July 19, 1954, Serial No. 444,127

8 Claims. (Cl. 206—.5)

This invention relates to a fabric or container through which useful qualities of a material is infused in a liquid, for example in the steeping of tea.

Proper steeping of tea is a critical procedure and ordinarily poor flavored beverages are the rule. Consequently there has been little incentive for the public to utilize tea as a beverage.

The proper preparation of tea requires an exact quantity of tea per cup of actively boiling water. The water must be poured over the tea and left to steep quietly for a certain period of time. If the time is too short the tea is flat and tasteless, if the steeping time is too long the beverage is strong and bitter in that it contains undesirable fines and extracts from the tea leaves.

The tea industry has partially solved the problems as to quantity and timing by packaging tea in individual bags containing the exact amount of tea required to give the proper flavor, but the bag must be removed within a two or three minute time period.

In most instances the bags are made of fabric or absorbent paper having the strength and size to hold approximately one teaspoon per cup of water used. For convenience, the bag is attached to a string, carrying a tab on its free end to facilitate placement of the bag in a cup while boiling water is poured thereover in filling the cup. The tab is also intended to hang over the rim of the cup to facilitate removal of the bag.

Upon wetting of the bag by the water, the desirable components of the tea infuse through the fabric of the bag and in two or three minutes result in a satisfactory beverage. However, the bag must then be removed from the cup in order to avoid a too strong or bitter flavor.

This method of packaging tea has resulted in the increased popularity of tea as a beverage because of the improved flavor of the drink and more convenient handling of the tea, but prior to the present invention the bag method of handling the tea had faults, which are, the bag must be removed from the cup, the wet bag is messy and not easily disposed of in a graceful manner.

Another difficulty is that people often attempt to make two or more cups from the same bag as a matter of economy, and get a drink that contains the undesirable components of the tea leaf and becomes progressively weaker and less satisfying.

The principal object of the present invention is to provide a bag having a construction which allows infusion of the tea for a definite period of time and which automatically stops infusion at the expiration thereof. In this way the proper steeping time is assured automatically and there is no critical period in which the bag must be removed, in fact, there is no necessity of removing the bag from the cup and therefore the usual string and tab may be omitted.

A further object of the invention is to provide a bag which can be used only a single time.

In accomplishing these and other objects of the invention as hereinafter pointed out, I have provided improved structure the preferred forms of which are illustrated in the accompanying drawings wherein:

Fig. 1 is a perspective view of a bag embodying the features of the present invention, the bag being shown as lifted from the water contained in the cup to better illustrate the bag.

Fig. 2 is an enlarged view of the bag particularly illustrating impregnated areas and the spaces therebetween through which the infusion takes place.

Fig. 3 is a fragmentary cross section taken along the lines 3—3 of Fig. 2 through one side wall of the bag showing the impregnated areas with the intermediate infusion areas.

Fig. 4 is a side elevational view of the bag similar to Fig. 2 by showing the impregnated areas spreading over the wall of the bag to close up the infusion areas.

Fig. 5 is a section similar to Fig. 3 and taken along the line 5—5 of Fig. 4 by showing the complete spread of the impregnated areas enclosing the walls of the bag to infusion of the tea into the water.

Fig. 6 is a cross section through a modified form of the invention where the closure material is spotted or printed upon the exterior surface of the bag.

Fig. 7 is a cross section similar to Fig. 6 but showing spread of the closure material completely over the wall of the bag.

Fig. 8 is a side elevational view of another modified form of the invention where the bag comprises a fibrous or porous material, which under action of the water, closes the walls of the bag to passage of the undesirable components of the tea.

Fig. 9 is a further modified form of the invention wherein the bag is woven of strands to provide intermediate passageways for the infusion of the tea and which are capable of closing the passageways after a predetermined time interval.

Referring more in detail to the drawings:

1 designates a container embodying the features of the present invention. The container illustrated is in the form of a bag particularly devised for containing a measured quantity of tea and used in the preparation of an individual serving. The bag may be of various shapes but for convenience of manufacture, it is preferably flat and of generally rectangular form. Therefore, the bag has two sides 2 and 3 secured together at the edges to contain the tea therebetween. Since the bag is of flat character, it is easily formed of a strip material of a type permitting infusion of the tea therethrough when the bag is contained in a cup of previously boiling water.

A specific form of material is a filter type of paper such as used in the construction of conventional tea bags. Other suitable materials are cotton, silk or synthetic fabrics.

In forming the bag illustrated, a rectangular strip of the material is folded transversely midway of its length to provide the sides 2 and 3 and form one of the connected edges by the fold 4. The marginal edges 5, 6, and 7 of one side are connected in face-to-face contact with the corresponding marginal edges of the other side as by folding, crimping, stitching or by a moisture proof adhesive.

A string 8 may be connected at one end of the bag by a staple 9 and attached to the free end of the string is a tab 10 as in conventional tea bag construction. The bag thus far described contains the tea 11 in the conventional manner and is used by placing the bag in a tea cup or the like 12 with the string 8 hanging over the rim of the cup whereby the tab 10 is handy to remove the tea bag after a predetermined time as judged by the coloring of the boiling water 13 that is poured into the cup.

During the steeping process, the soluble extracts of the tea leaves infuse through the sides 2 and 3 of the bag to produce a beverage. The time and extent of the fusion process and the handling of the tea bag are critical in order to obtain a tea beverage of pleasing flavor. This is because the slowly soluble extracts of the tea leaves and fines have time to pass through the bag and into the cup causing a bitter and undesirable taste in the tea. Also, when the bag is removed from the cup the liquid within drains out into the cup carrying the undesirable components and fines therewith to further contaminate the beverage.

Another disadvantage is that people have a desire, for the sake of economy, to use the bag to make more than one cup of tea with the result that the tea gives such poor results that it causes the tea drinker to lose his desire for tea as a main beverage.

The present invention eliminates these difficulties and promotes the pleasant use of tea by providing the tea bag with means for limiting the infusion period to the maximum time during which a good cup of tea is obtainable, and to confine and prevent escape of the undesirable components of the tea from the bag. By completely stopping the infusion process, it is not necessary to remove the tea bag from the cup, in fact, the string and tab 10 may be entirely omitted from the present invention if desired.

In carrying out the present invention various modifications may be utilized in accomplishing the desired results, four forms being illustrated in the drawings, and anyone of which accomplishes the desired result of stopping infusion and confining the contents of the bag after a predetermined time interval. The contents of the bag are therefore automatically sealed off from the beverage which eliminates any drainage or seeping of the undesirable extracts or fines into the cup.

Referring first to the form of invention illustrated in Figs. 1 to 4 inclusive, the sides 2 and 3 of the portions of the bag in which the tea is contained has spaced apart areas 14 thereof impregnated with a thermo-responsive material that gradually softens and/or melts responsive to the heat of the water to spread through the material of the bag as by absorption or capillary action through the unimpregnated portions 15 thereby sealing off the remaining contents 14 of the bag after a predetermined time interval as governed by the time for the material to completely cover or penetrate the entire sides of the bag.

The control material may be a water insoluble material such as used for the protective coating of food products, namely petroleum, mineral, or synthetic waxes, resins and plastics or blends thereof to give a melting and/or spreading temperature near the temperature of the water placed in the cup for example 190 to 195 degrees Fahrenheit. A specific wax is paraffin such as used in the coating of paper milk cartons. Another example is "Atlantic Durafin" wax. Thermo plastics that have the desired melting or spreading temperature may also be used, such as a polyethylene.

In this form of the invention the control material is applied to the sides of the bag much in the manner of printing to provide a plurality of spaced apart areas or dots as indicated by the circles 16 in Fig. 2 and by the darker areas 17 of Fig. 3. It is obvious that these areas are substantially impervious to infusion of the tea, however, the untreated areas 15 intermediate the circles permit ready infusion of the tea extract through the sides of the bag until the control material in the impregnated portions 14 begin to soften or melt responsive to temperature of the water, the material on softening and/or melting spreads and is absorbed into the infusion areas 15 by capillary action so as to shut off the infusion action and isolate the contents of the bag from the tea beverage.

The time element is attained by the quantity of the control material used and the spacing and extent of the infusion areas therebetween. For example, the larger the infusion area and the smaller quantity of control material, the longer the time interval during which infusion can take place through the sides 2 and 3 of the bag.

Figs. 4 and 5 show the control areas 14 becoming larger and spreading over the infusion areas which become gradually smaller until they are completely covered or closed off.

The modified form of the invention illustrated in Fig. 6 comprises a plastic or wax 18 that does not penetrate into the fabric or material of the bag but is applied as printing to the inner or outer side surfaces of the bag. In the illustrated instance, the control material is shown as applied to the exterior surface to give the desired spaces 19 therebetween forming the infusion areas. When this form of the bag is used, the control material softens and spreads over the surface of the bag to complete the closure as shown at 20 in Fig. 7.

The form of invention illustrated in Fig. 8 comprises a bag having a fabric composed of a mixture of impregnated and unimpregnated strands, the impregnated strands being illustrated by the heavy lines 21 and the unimpregnated strands by the lighter lines 22. In this instance, the impregnated strands which carry the control material effect closure in and around the unimpregnated strands after a predetermined time interval as controlled by the relative proportions of the strands and compaction thereof.

The form of the invention shown in Fig. 9 includes a bag having the sides formed of woven material 23 wherein the spaces 24 between the warp- and woof-threads or strands 25 and 26 are closed after a predetermined time interval responsive to wetting by the hot water used in making tea.

In using the bag illustrated in Figs. 1 to 5 inclusive, the bag containing the tea is placed in the cup and boiling or near boiling water is poured into the cup over the tea bag. The water wets through the material of the bag and the tea infuses through the sides 2 and 3 to form the tea beverage in the cup. The control material in the impregnated areas 14 is activated by the hot water so as to soften and/or melt the material so that it gradually spreads through absorption into the areas 15 through which the tea infuses. By the time that the infusion is completely stopped upon closure of all of the areas 15, the beverage has the proper strength and taste to give a highly satisfactory beverage.

Since the contents of the bag has been closed off from the beverage in a cup, none of the disagreeable factors and fines escape to spoil the taste of the tea. The bag may, therefore, be left in the bottom of the cup. It is impossible to use the bag the second time because the infusion areas have all been covered to render the bag useless, consequently, a new bag will be used on the second cup to give a beverage of uniform quality and strength.

The form of invention illustrated in Figs. 6 and 7 operates in a similar manner but in this instance the control material merely spreads over the surface of the bag to which the material is applied.

The form of invention illustrated in Fig. 8 operates in a similar manner with the exception that the impregnated fibers act to close the infusion areas in the sides of the bag.

In the form of the invention shown in Fig. 9 the infusion areas are blocked by swelling of the strands of the fabric in closing of the apertures therebetween.

From the foregoing it is obvious that I have provided a container or the like by which infusion may be controlled and stopped after a predetermined time interval so as to control the infusion of the material from the container into a liquid, for example, as in the preparation of a tea beverage.

What I claim and desire to secure by Letters Patent is:

1. Means for controlling infusion through a porous material consisting of a thermo-plastic on portions of said material and having a melting point in the temperature range of 190° to 212° Fahrenheit and viscosity to effect substantially complete spread over the material when contained in said temperature range for a predetermined time interval, said time interval being determined by the spacing and quantity of the thermoplastic.

2. A container for material to be infused in a liquid at a temperature of 190° to 212° F. when the container is submerged in the liquid, said container having a porous wall through which the material is infused when in said liquid, and heat responsive and non-soluble sealing material covering spaced apart areas on said wall and defining therebetween infusion areas through said wall, said material being fusible at a temperature within the range of 190° to 212° Fahrenheit and of a quantity relatively to the said spaced apart areas to spread over and substantially close off said infusion areas under the effect of the hot liquid on said sealing material.

3. A container for material to be infused in hot water when the container is submerged in said water, said container having a porous wall through which the material is infused when in said water, and means on said wall for timing the period of infusion, said means comprising a heat responsive non-soluble sealing material having a fusing temperature in the range of 190° to 212° Fahrenheit and covering spaced apart areas on said wall for defining therebetween infusion areas through said wall of an extent relatively to the quantity of the sealing material in the surrounding areas to diffuse across and cover said infusion areas when the material is heated within said hot water for forming a seal across said infusion areas for stopping infusion.

4. A container for material to be infused in a liquid when the container is submerged in said liquid when the liquid is in the temperature range of 190° to 212° Fahrenheit, said container having a porous wall through which the material is infused when in said liquid, and means on said wall for timing the period of infusion at said temperature range, said means comprising spaced apart quantities of a heat responsive non-soluble sealing material on a face of said wall with the spaces therebetween defining infusion areas through said wall, said heat responsive material being heat responsive in the temperature range of 190° to 212° Fahrenheit and in quantities relatively to said infusion areas to spread and provide a substantially continuous coating over the entire face of said wall to stop infusion responsive to the temperature of said liquid.

5. A container for a material to be infused into a liquid when the container is wetted in said liquid in the temperature range of 190° to 212° Fahrenheit, said container including a bag providing infusion areas and having thermo-responsive means incorporated in said bag and having a responsive temperature within the temperature range of 190° to 212° Fahrenheit for closing off said infusion areas to the infusion of said material.

6. A container for a material to be infused into a liquid when the container is wetted in said liquid in a temperature range of 190° to 212° Fahrenheit, said container including a bag providing infusion areas and having a thermo-responsive means incorporated in said bag and having a responsive temperature within the range of 190° to 212° Fahrenheit to close off the bag to the infusion of said material into the liquid, said means having a delayed response to the action of the liquid thereon.

7. A container for tea to be infused in water within the temperature range of 190° to 212° Fahrenheit, said container including a bag having portions through which the tea infuses into the water and incorporating properties of stopping said infusion after a predetermined period within said temperature range of 190° to 212° Fahrenheit.

8. A container for tea to be infused in water near the boiling point thereof when the container is wetted in said water, including a bag having portions through which tea infuses into the water and having portions of fusible material intermediate the portions through which the tea infuses, said fusible material having a fusing temperature within the temperature range of 190° to 212° Fahrenheit to spread over and close said bag after a predetermined time period.

References Cited in the file of this patent

UNITED STATES PATENTS

| | | |
|---|---|---|
| 1,324,662 | Goldsworthy | Dec. 9, 1919 |
| 1,576,735 | Fessenden | Mar. 16, 1926 |
| 2,147,831 | Doble | Feb. 21, 1939 |
| 2,407,549 | Gurwick | Sept. 10, 1946 |
| 2,531,594 | Abrahams | Nov. 28, 1950 |
| 2,619,089 | Swartz | Nov. 25, 1952 |